US012732896B2

(12) United States Patent
Vivanco

(10) Patent No.: US 12,732,896 B2
(45) Date of Patent: Sep. 8, 2026

(54) SYSTEM INFORMATION DELIVERY SWITCHING OVER ADVANCED NETWORKS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 824 days.

(21) Appl. No.: 17/931,630

(22) Filed: Sep. 13, 2022

(65) Prior Publication Data

US 2024/0089829 A1 Mar. 14, 2024

(51) Int. Cl.
*H04W 48/10* (2009.01)
*H04W 48/16* (2009.01)

(52) U.S. Cl.
CPC ........... *H04W 48/10* (2013.01); *H04W 48/16* (2013.01)

(58) Field of Classification Search
None
See application file for complete search history.

(56) References Cited

U.S. PATENT DOCUMENTS

| | | | | |
|---|---|---|---|---|
| 2016/0337931 | A1 | 11/2016 | Wang et al. | |
| 2018/0310235 | A1 | 10/2018 | You et al. | |
| 2019/0007892 | A1 * | 1/2019 | Sheik .................... | H04W 68/00 |
| 2019/0159110 | A1 | 5/2019 | Takahashi et al. | |
| 2019/0174554 | A1 | 6/2019 | Deenoo et al. | |
| 2019/0246319 | A1 | 8/2019 | Lee et al. | |
| 2019/0261421 | A1 | 8/2019 | Peisa et al. | |
| 2019/0313260 | A1 | 10/2019 | Zhang et al. | |
| 2019/0357227 | A1 | 11/2019 | Khirallah et al. | |
| 2019/0387456 | A1 * | 12/2019 | Ishii ...................... | H04W 48/16 |
| 2020/0178253 | A1 | 6/2020 | Gao et al. | |
| 2020/0236613 | A1 | 7/2020 | Frenger et al. | |
| 2020/0322878 | A1 | 10/2020 | Prabhakar et al. | |
| 2021/0037556 | A1 * | 2/2021 | Venkatram ............ | H04W 24/08 |
| 2021/0084578 | A1 * | 3/2021 | Ingale ................... | H04W 72/23 |
| 2022/0104094 | A1 | 3/2022 | Lei et al. | |

(Continued)

OTHER PUBLICATIONS

"Non-Final Office Action for U.S. Appl. No. 17/932,058", Dec. 18, 2024, 24 pages.

(Continued)

*Primary Examiner* — Adolf Dsouza
(74) *Attorney, Agent, or Firm* — Guntin & Gust, PLC; Daniel P. Williams

(57) ABSTRACT

System information status is dynamically adjusted at a base station (e.g., a 5G gNB) from not broadcasting other system information block(s) to broadcasting, and vice versa, based on network condition data to improve network performance. When a sufficient number of user equipment devices are expected to transition from idle to connected mode, the base station broadcasts additional system information beyond minimum system information (e.g., SIB1) previously transmitted on-demand. A core network component can initiate the change, with the updated SIB1 data periodically broadcast to user equipment. A paging message is transmitted to instruct user equipment to process the updated SIB1 data. The system can revert to not broadcasting other system information when the network determines that broadcasting is unnecessary.

20 Claims, 10 Drawing Sheets

(56) References Cited

U.S. PATENT DOCUMENTS

| | | | |
|---|---|---|---|
| 2022/0104109 | A1 | 3/2022 | Lei et al. |
| 2022/0239354 | A1 | 7/2022 | Zhao et al. |
| 2022/0377649 | A1 | 11/2022 | Choi et al. |
| 2023/0007621 | A1 | 1/2023 | Fu et al. |
| 2024/0089032 | A1 | 3/2024 | Vivanco |
| 2024/0089800 | A1 | 3/2024 | Vivanco |
| 2024/0098679 | A1 | 3/2024 | Ghimire et al. |
| 2024/0345210 | A1* | 10/2024 | Li ......................... G01S 13/422 |

OTHER PUBLICATIONS

"Notice of Allowance received for U.S. Appl. No. 17/932,150, May 14, 2025, 13 pages".

* cited by examiner

442

Variable Based on Condition Data

440

```
SchedulingInfo ::= SEQUENCE {
   si-BroadcastStatus ENUMERATED {broadcasting, notBroadcasting},
   si-Periodicity ENUMERATED {rf8, rf16, rf32, rf64, rf128, rf256, rf512},
   sib-MappingInfo SIB-Mapping
}
```

FIG. 6

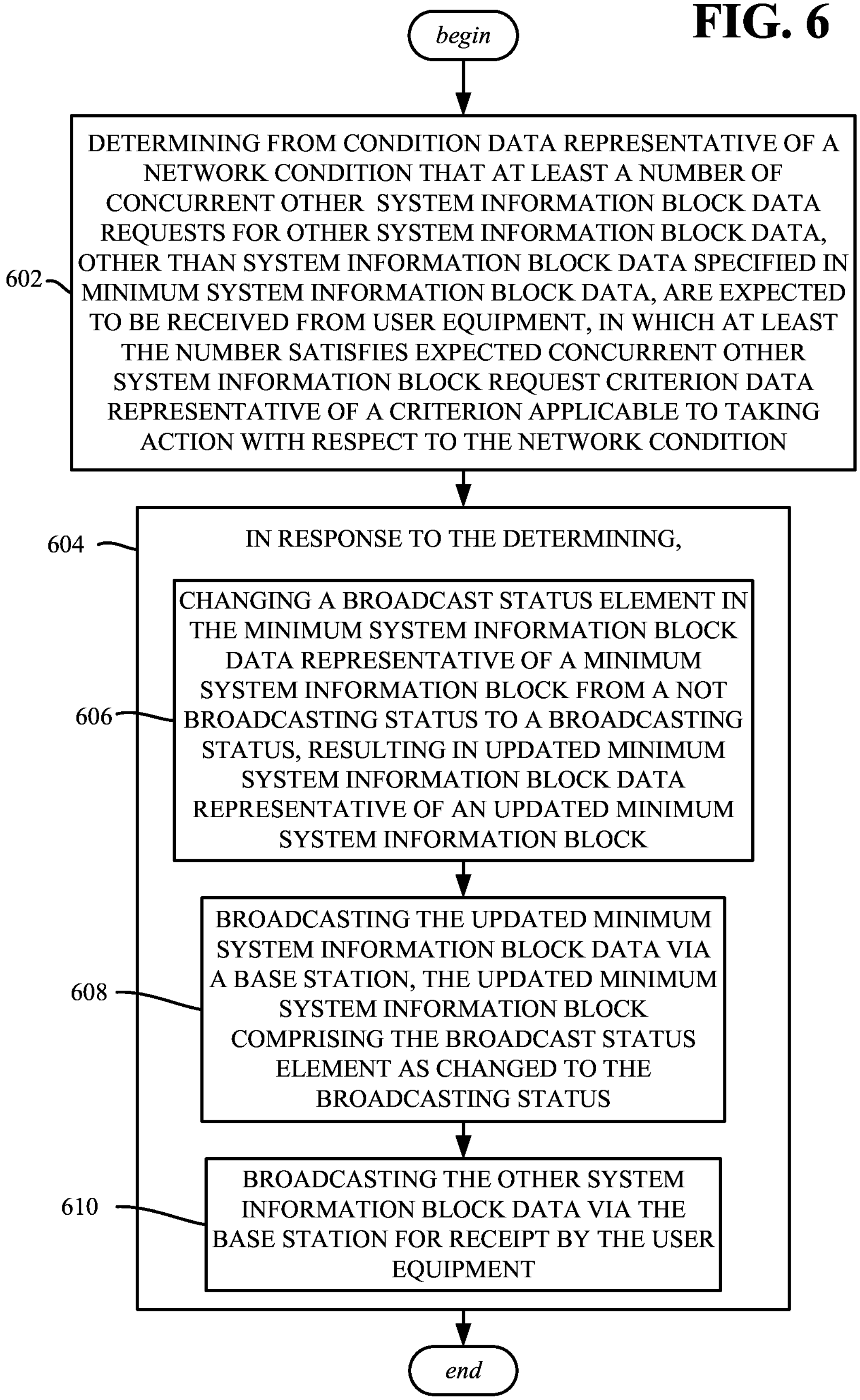

602 DETERMINING FROM CONDITION DATA REPRESENTATIVE OF A NETWORK CONDITION THAT AT LEAST A NUMBER OF CONCURRENT OTHER SYSTEM INFORMATION BLOCK DATA REQUESTS FOR OTHER SYSTEM INFORMATION BLOCK DATA, OTHER THAN SYSTEM INFORMATION BLOCK DATA SPECIFIED IN MINIMUM SYSTEM INFORMATION BLOCK DATA, ARE EXPECTED TO BE RECEIVED FROM USER EQUIPMENT, IN WHICH AT LEAST THE NUMBER SATISFIES EXPECTED CONCURRENT OTHER SYSTEM INFORMATION BLOCK REQUEST CRITERION DATA REPRESENTATIVE OF A CRITERION APPLICABLE TO TAKING ACTION WITH RESPECT TO THE NETWORK CONDITION

604 IN RESPONSE TO THE DETERMINING,

606 CHANGING A BROADCAST STATUS ELEMENT IN THE MINIMUM SYSTEM INFORMATION BLOCK DATA REPRESENTATIVE OF A MINIMUM SYSTEM INFORMATION BLOCK FROM A NOT BROADCASTING STATUS TO A BROADCASTING STATUS, RESULTING IN UPDATED MINIMUM SYSTEM INFORMATION BLOCK DATA REPRESENTATIVE OF AN UPDATED MINIMUM SYSTEM INFORMATION BLOCK

608 BROADCASTING THE UPDATED MINIMUM SYSTEM INFORMATION BLOCK DATA VIA A BASE STATION, THE UPDATED MINIMUM SYSTEM INFORMATION BLOCK COMPRISING THE BROADCAST STATUS ELEMENT AS CHANGED TO THE BROADCASTING STATUS

610 BROADCASTING THE OTHER SYSTEM INFORMATION BLOCK DATA VIA THE BASE STATION FOR RECEIPT BY THE USER EQUIPMENT end

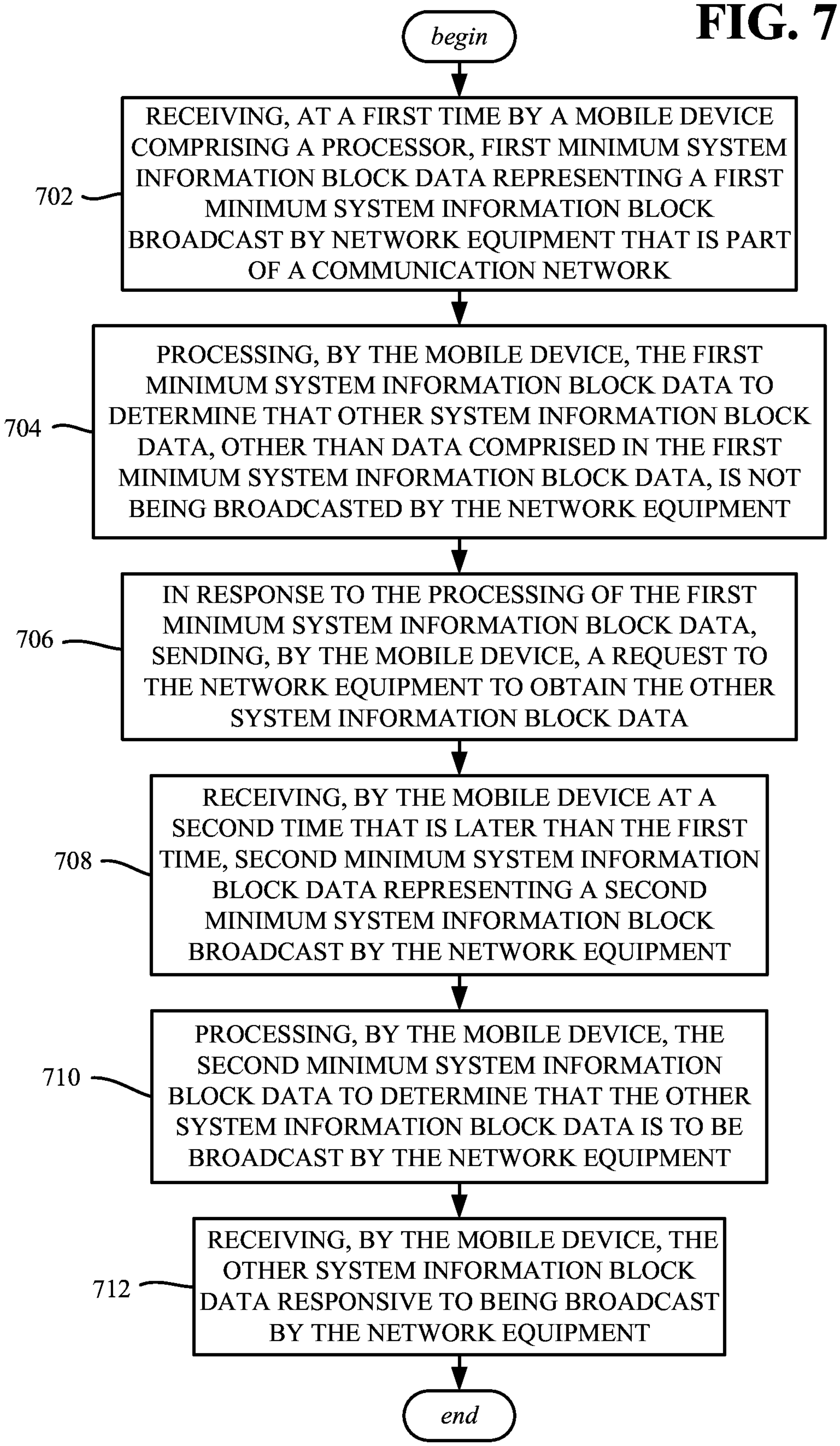

FIG. 7
begin
702
RECEIVING, AT A FIRST TIME BY A MOBILE DEVICE COMPRISING A PROCESSOR, FIRST MINIMUM SYSTEM INFORMATION BLOCK DATA REPRESENTING A FIRST MINIMUM SYSTEM INFORMATION BLOCK BROADCAST BY NETWORK EQUIPMENT THAT IS PART OF A COMMUNICATION NETWORK
704
PROCESSING, BY THE MOBILE DEVICE, THE FIRST MINIMUM SYSTEM INFORMATION BLOCK DATA TO DETERMINE THAT OTHER SYSTEM INFORMATION BLOCK DATA, OTHER THAN DATA COMPRISED IN THE FIRST MINIMUM SYSTEM INFORMATION BLOCK DATA, IS NOT BEING BROADCASTED BY THE NETWORK EQUIPMENT
706
IN RESPONSE TO THE PROCESSING OF THE FIRST MINIMUM SYSTEM INFORMATION BLOCK DATA, SENDING, BY THE MOBILE DEVICE, A REQUEST TO THE NETWORK EQUIPMENT TO OBTAIN THE OTHER SYSTEM INFORMATION BLOCK DATA
708
RECEIVING, BY THE MOBILE DEVICE AT A SECOND TIME THAT IS LATER THAN THE FIRST TIME, SECOND MINIMUM SYSTEM INFORMATION BLOCK DATA REPRESENTING A SECOND MINIMUM SYSTEM INFORMATION BLOCK BROADCAST BY THE NETWORK EQUIPMENT
710
PROCESSING, BY THE MOBILE DEVICE, THE SECOND MINIMUM SYSTEM INFORMATION BLOCK DATA TO DETERMINE THAT THE OTHER SYSTEM INFORMATION BLOCK DATA IS TO BE BROADCAST BY THE NETWORK EQUIPMENT
712
RECEIVING, BY THE MOBILE DEVICE, THE OTHER SYSTEM INFORMATION BLOCK DATA RESPONSIVE TO BEING BROADCAST BY THE NETWORK EQUIPMENT
end

900

MOBILE HANDSET

APPLICATIONS 906

CLIENT (STORE, DISCOVERY, PLAY) 946

938 TRIGGER COMPONENT

936 HYSTERESIS COMPONENT

940 SIP CLIENT

908 FIRMWARE

930 VIDEO COMP

912 DISPLAY

922 CAMERA

914 SERIAL I/O INTERFACE

935 USER INPUT 918 920 SUBSCRIBER IDENTITY SYSTEM

910 COMMUNICATION COMPONENT

911 CELL TCVR

913 WIFI TCVR

902 PROCESSOR

MEMORY 904

932 LOCATION COMPONENT

916 AUDIO I/O

924 POWER SOURCE

926 POWER I/O

SYSTEM INFORMATION DELIVERY SWITCHING OVER ADVANCED NETWORKS

TECHNICAL FIELD

The subject application relates to the delivery of system information to user equipment, and related embodiments, via advanced networks, e.g., fifth generation networks and beyond.

BACKGROUND

System information (SI) for user equipment is classified into a master information block (MIB) and system information blocks (SIBs). The master information block includes fundamental information needed by user equipment to begin to communicate, including system frame number and system bandwidth data, and is periodically broadcast on the physical broadcast channel (PBCH). System information blocks contain scheduling and cell access information, and are broadcast on the physical downlink shared channel (PDSCH).

In new radio, including fifth generation (5G) networks, the master information block and system information block type1 (SIB1) are defined as minimum SI, while the other system information blocks (SIB2, SIB3, and so on) are defined as other SI. The minimum SI contains the basic information for acquiring the other SI blocks and processing initial access, and is broadcast periodically in a system information window by the base station (a gNodeB (gNB) in 5G). Unlike minimum SI delivery, the other SI contains additional information that can be delivered on demand when needed, referred to in 5G new radio as on-demand SI delivery With respect to other SI delivery, network operators configure each base station to either broadcast the other SIB(s) or send them in response to a request from each user equipment device. This is indicated to the user equipment via a si-BroadcastStatus data element in the SIB1 message, set as either si-BroadcastStatus='broadcasting' or si-BroadcastStatus='notbroadcasting'. If not broadcasting the other SI, a user equipment device proceeds with a random access procedure to acquire the other SIB(s), including requesting the other SI, and monitoring the next SI window to receive the other SIB(s), which can be a broadcast or unicast communication. Not broadcasting the other SI conserves base station resources, but can lead to issues under certain conditions, including when requests for the other SI from multiple user equipment collide and need to be retransmitted.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 6 is a flow diagram representing example operations related to changing from a not broadcasting status to a broadcasting status, in accordance with various aspects and embodiments of the subject disclosure.

FIG. 7 is a flow diagram representing example operations related to user equipment operations with respect to a change from a not broadcasting status to a broadcasting status, in accordance with various aspects and embodiments of the subject disclosure.

DETAILED DESCRIPTION

Figure 1:
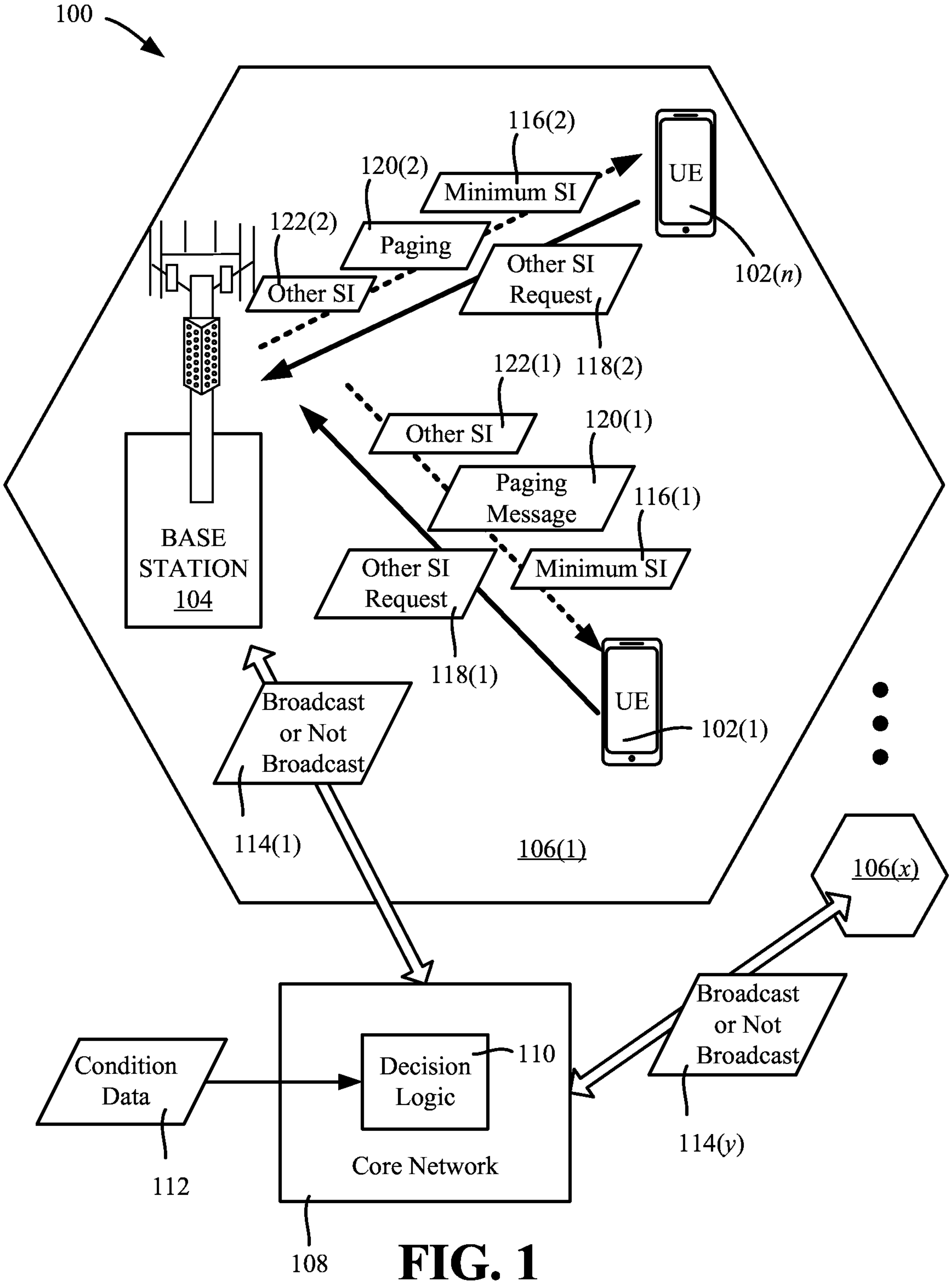
FIG. 1 is a block diagram of an example system in which condition data can change a base station's broadcasting or not broadcasting of other system information block(s), in accordance with various aspects and embodiments of the subject disclosure.

The technology described herein is generally directed towards improving system usage over fifth generation networks and beyond using on-demand system information delivery. The technology described herein is based on determining (e.g., predicting/estimating) situations in which a large number of mobile devices (user equipment devices, or UEs) will transition from idle to connected mode at an upcoming time, such as the near future, whereby base stations (gNBs) change from on-demand responding to system information to UEs to broadcasting system information to UEs. This reduces resource consumption, including signaling overhead. The technology also facilitates reverting to on-demand responding to requests for system information received from UEs.

The technology described herein thus dynamically adjusts system information status at one or more base stations based on expected network conditions to achieve more optimal system performance. In various implementations, the technology described herein that makes the broadcasting versus on-demand responding determination can be located at a central node global control located on the core network, such as via mobile edge computing (MEC), a self-organizing network (SON) and/or a radio access network (RAN) intelligent controller (RIC).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system 100 comprising a number of user equipment devices (UEs)/mobile devices 102(1)-102(*n*) coupled to a base station 104 associated with a cell 106(1). In turn, the base station 104 is coupled to a core network 108, such as, but not limited to, mobile edge compute (MEC), self-organizing network (SON) and/or a radio access network (RAN) intelligent controller (RIC). As shown in FIG. 1, the core network 108 is typically associated with a number of other cells, e.g., as represented in FIG. 1 by the cell 106(*x*).

The core network 108 incorporates or is coupled to decision logic 110, which has the ability to determine when a relatively large number of UEs in the network are likely going to switch from idle mode to connected mode. This may include when an alert/important message has been delivered or is about to be delivered to user equipment, or when other information indicates a likelihood of UEs waking up. Such condition data 112 can be, for example, based on an alert (such as an amber alert) or some unexpected event (such as an earthquake or terrorist attack). This can also be, for example, condition data 112 based on historical data, e.g., many users wake up at the same time on workday mornings and check their mobile devices. When such events occur in a cell that is responding to requests for other system information (SIB2, SIB3, and so on) on demand, the requests can collide, resulting in retransmission of the requests causing significant system overhead.

More particularly, after reading the SI scheduling information from the SIB1, the UE first determines broadcast status (via si-BroadcastStatus). If si-BroadcastStatus is set 'broadcasting', the UE attempts to acquire the other SIB(s) normally by waiting (listening) for the next broadcast. If the si-BroadcastStatus is set 'notbroadcasting', the UE would proceed with a random access procedure to acquire those other SIB(s).

In one example, consider that the decision logic 110 obtains knowledge of an incoming alert/message and determines whether the base stations involved can yield to a large number of UEs waking up and engaging into network service (voice, social media communications, messaging and the like). In such a situation, the decision logic 110 performs a number of possible actions, such as determining which base stations may be affected. For example, consider that an earthquake is generally limited to an area, served by a number of base stations, e.g., including the base station 104 of the cell 106(1) and a similar base station of the cell 106(*x*). For these base stations, the decision logic 110 instructs them to change from "on-the-fly" system information delivery from not broadcasting to broadcasting, represented via blocks 114(1)-114(*y*). In the third generation partnership project (3GPP) standards, this is not done, because base stations are fixed to either SI-BroadcastStatus='notbroadcasting' or SI-BroadcastStatus='broadcasting' in system information block type1 (SIB1) communications. The technology described herein facilitates changing from the SI-BroadcastStatus='notbroadcasting' status to SI-BroadcastStatus='broadcasting' status, and vice-versa, based on condition data 112 as evaluated with respect to at least one change criterion.

In some situations, there can be some UEs that have already processed (including to have read and decoded) an older SIB1 message, that is, the SIB1 message with SI-BroadcastStatus='notbroadcasting' status as described herein. More particularly, in this example when a UE (e.g., 102(1)) acquires the periodically broadcast minimum system information data (MIB and SIB1) 116(1), which indicates that the base station is not broadcasting (is responding on demand to requests for other SIB data), the UE 102(1) sends a system information request 118(1) directly to the base station 104.

When not broadcasting, only upon receiving an SI request from a UE will the base station deliver the requested other SIB data in the SI window/in a response period, where the response can be either broadcast or unicast. The base station can utilize beams to sweep over the whole-cell coverage. The base station broadcasts on one beam at a time so that the cell is entirely covered after a full sweeping. The UE request mechanism for on-demand SI can also be designed in different ways; for example when UEs request the SI through the random access procedure, the request message can be either MSG1-based or MSG3-based.

Figure 2:
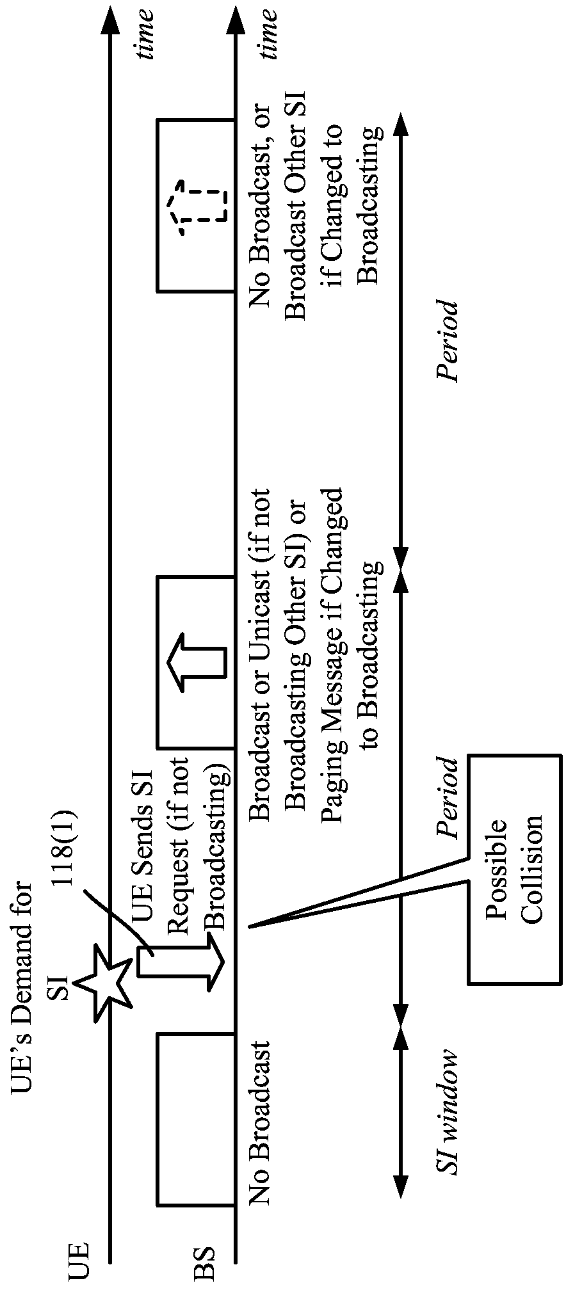
FIG. 2 is an example timing diagram of showing communications when broadcasting or not broadcasting other system information block(s), in accordance with various aspects and embodiments of the subject disclosure.

Following the system information request 118(1), shown as an arrow in the timing diagram of FIG. 2, the UE 102(1) monitors the next SI window to receive the requested SIB data (the other SI block(s)) from the base station (BS). The on-demand response can be broadcast or unicast to the requesting UE, but is not transmitted unless and until the base station receives the request. However, this UE request may not be received by the base station if many UEs are concurrently making the same request, due to collisions/interference and the like. Thus, the UEs will repeat their requests, again causing problems, including consuming significant overhead, consuming UE battery power, and the like.

Figure 3:
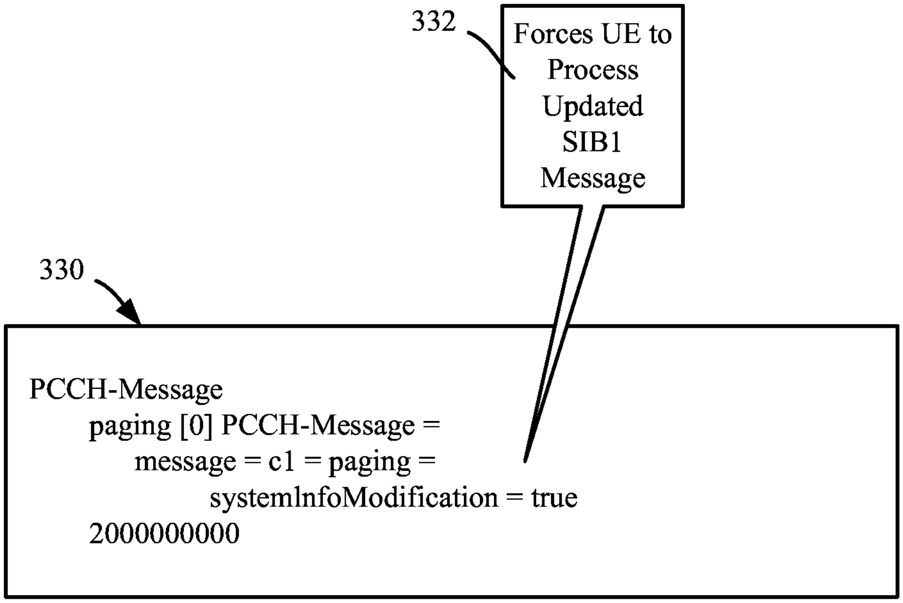
FIG. 3 is an example system data structure of a paging message sent to user equipment, in accordance with various aspects and embodiments of the subject disclosure.

Returning to FIG. 1, as a result, any UEs that have read the previous SIB1 message expect a response, but none may be forthcoming. Thus, when the base station 104 has changed from not broadcasting status to broadcasting status, the decision logic 110 (via the base station 104) also sends a paging message 120(1) (as represented in FIG. 3 via the data structure 330 and associated block 332) that basically forces UEs to read the new SIB1 message indicating the change to broadcasting status; that is, the paging message indicates in one implementation that 'SystemInfoModification=TRUE'. Note that paging messages are meant to be received by UEs in idle mode; however, when a UE reads a paging message with SystemInfoModification=TRUE, this paging message instructs UEs to process (read and decode) the newer SIB1. Thus, the UEs that had processed the older SIB will now see the SIB1 SI-BroadcastStatus='broadcasting' status indication and receive the other SI data via the next periodic broadcast thereof, e.g., represented via blocks 122(1) and 122(2) in FIG. 1.

Further, the decision logic 110 can monitor the number of UEs that transition from RRC-Idle to RRC-Connected mode (RRC stands for radio resource control) per base station, e.g., in an affected area, and surrounding base stations, to decide if other base stations need to be included in the switch to broadcasting mode. Also, the decision logic 110 decides when the SI-BroadcastStatus status can be changed back to SI-BroadcastStatus='notbroadcasting', e.g., when the decision logic 110 determines that this change is no longer needed. Another paging message can be sent so that UEs read the most recent (changed) SIB1 status indicator.

It should be noted that while the decision logic 110 is shown in FIG. 1 as being in the core network 108, a base station can make its own decisions with respect to changing the other system information broadcast status. In general, although normally following a decision by the core network, a base station may revert from BroadcastStatus='broadcasting' to BroadcastStatus='notbroadcasting' or vice versa. For example, consider a base station serving a relatively sparse rural area affected by some event that at first results in a spike in requests for other system information, but detects a drop in requests shortly thereafter. Although more densely populated cells may maintain their broadcasting status longer, the other cell need not necessarily wait for the core network decision logic to do so; the decision logic at the core network can be cell by cell, or a group decision that each cell can override as needed. The core network can, if deemed appropriate, resend the broadcast or not broadcast instruction (e.g., another event has occurred).

As another example, a cell can determine for some additional reason, such as based on historical data that predict a spike in requests for the other system information, to switch from BroadcastStatus='notbroadcasting' to BroadcastStatus='broadcasting' (or vice versa once the predicted spike is over). In this way, the core network 108 need not maintain and analyze the historical or other data for each cell (although this is also feasible to do). Still further, in the opposite change direction, for a cell that should be always set to broadcasting status, e.g., in a heavily congested area that is almost constantly busy, a core network instruction to switch to not broadcasting can be overridden (e.g., ignored) so that broadcasting can continue.

Figure 4:
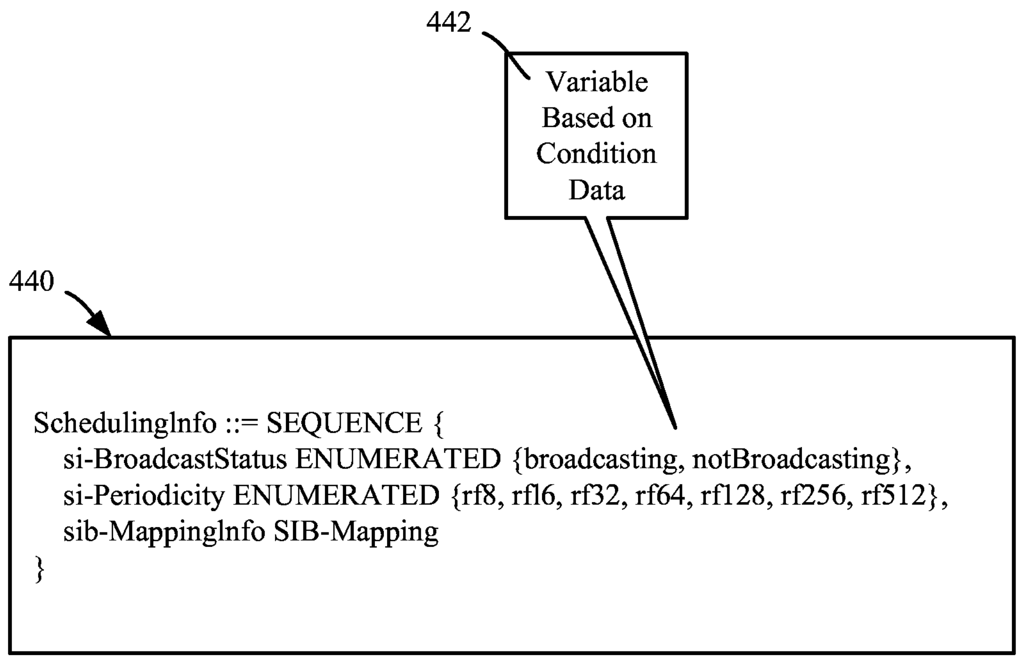
FIG. 4 is an example system data structure of variable scheduling information sent to user equipment, in accordance with various aspects and embodiments of the subject disclosure.

Thus, as represented in the data structure 440 of FIG. 4, the BroadcastStatus='notbroadcasting' status versus BroadcastStatus='broadcasting' status is variable (block 442) based on condition data such as based on the occurrence of an event or historical data. The condition data can be for a group of cells, or can be on a per-cell basis.

Figure 5:
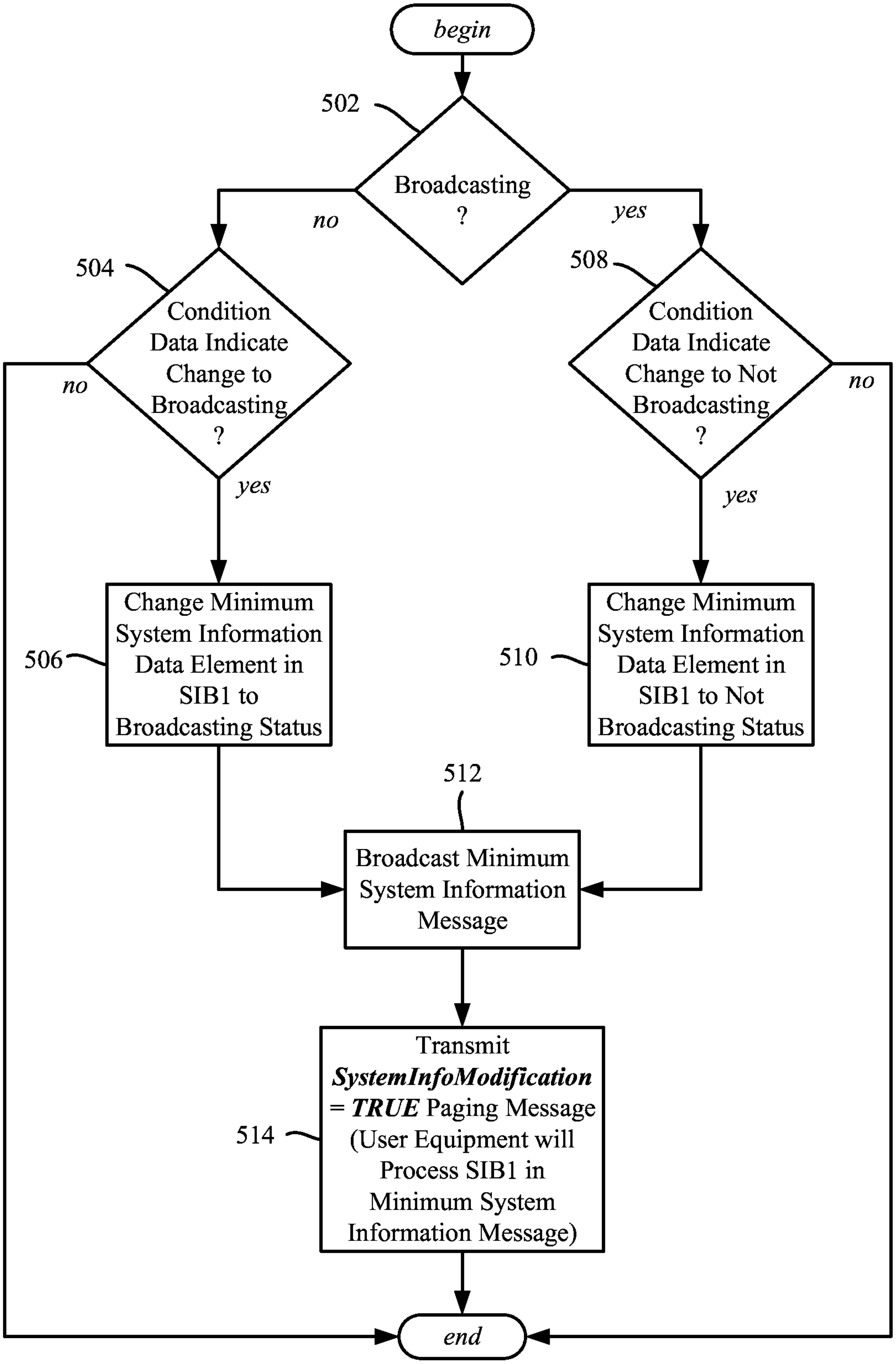
FIG. 5 is a flow diagram representing example operations related to deciding whether to switch from a not-broadcasting status to a broadcasting status, or vice-versa, in accordance with various aspects and embodiments of the subject disclosure.

FIG. 5 is a flow diagram showing example operations that can be performed by the decision logic 110 of FIG. 1, whether for a group of cells, per cell, or some subgroup of cells. Operation 502 evaluates whether a given cell (or group or subgroup) is currently broadcasting the other SI data.

In the case when not broadcasting and the condition data (decision operation 504) indicates to a network operator that there is a high likelihood that a large number of idle-mode UEs are going to transition to connected mode, e.g., following a disaster alert, a controversial referee decision at a sporting event, or any unexpected or historically predicted event in which may UEs may need to connect to the network and engage into various network services, operation 504 branches to operation 506, (otherwise, if the likelihood criterion is not satisfied, the process ends until some event occurs triggering a possible change). Thus, under appropriate circumstances, the core network or cell can expect a large number of concurrent SI-requests coming from many UEs in the near future, which can create heavy signaling overhead for the network, and connection delays for the UEs, because many of the SI-requests may collide with each other and require retransition by the UEs. In addition, UEs will spend a large amount of time and energy sending follow-up SI-requests, which wastes their battery power.

Thus, when performed, operation 506 changes the minimum system information data element in SIB1 to the broadcasting status. Operation 512 broadcasts the changed status as usual, whereby UEs will thereafter receive the other SIB(s) via broadcast (not explicitly shown in FIG. 5) until reverted back. As set forth above, a paging message is sent via operation 514 for any UEs that are acting according to older SIB1 data.

Returning to operation 502, in the case that a group of cells, subgroup or even one cell is broadcasting, operation 508 is performed to determine if broadcasting is needed/still appropriate. Note that this determination need not be based on the same criterion as switching to broadcasting from not broadcasting; e.g., different threshold levels for concurrent user equipment requests can be compared against estimated user requests for changing in the two different directions. If broadcasting (which if not needed wastes resources) is no longer appropriate, operation 510 reverts to not broadcasting status, with operations 512 and 514 similarly performed to change the status and update UEs. Although not explicitly shown in FIG. 5, the periodic broadcasting of the other system information is thus halted, and on-demand responding to UE request for the other system information is reverted to by the base station.

One or more example aspects are represented in FIG. 6, and can correspond to a system, including a processor, and a memory that stores executable instructions that, when executed by the processor, facilitate performance of operations. Example operation 602 represents determining from condition data representative of a network condition that at least a number of concurrent other system information block data requests for other system information block data, other than system information block data specified in minimum system information block data, are expected to be received from user equipment, in which at least the number satisfies expected concurrent other system information block request criterion data representative of a criterion applicable to taking action with respect to the network condition. Example operation 604 represents, in response to the determining, performing Example operation 606-610. Example operation 606 represents changing a broadcast status element in the minimum system information block data representative of a minimum system information block from a not broadcasting status to a broadcasting status, resulting in updated minimum system information block data representative of an updated minimum system information block. Example operation 608 represents broadcasting the updated minimum system information block data via a base station, the updated minimum system information block comprising the broadcast status element as changed to the broadcasting status. Example operation 610 represents broadcasting the other system information block data via the base station for receipt by the user equipment.

The minimum system information block can include a new radio master information block and a system information block type1 system information block.

The other system information block data can include at least one system information block other than a system information block type1 system information block.

The broadcast status element in the minimum system information block can include a new radio SI-BroadcastStatus element.

The condition data can include event data, and further operations can include estimating, based on the event data, the number of concurrent other system information block data requests that satisfies the expected concurrent other system information block request criterion data.

The condition data can include historical data, and further operations can include estimating, based on the historical data, the number of concurrent other system information block data requests that at least satisfies the expected concurrent other system information block request criterion data.

Further operations can include sending a paging message via the base station, the paging message indicating that a modification to system information has occurred, in which the paging message instructs the user equipment to process the minimum system information block comprising the broadcast status element as changed to the broadcasting status.

The criterion can include a first criterion, the determining can be a first determining, the condition data representative of the network condition is first condition data representative of a first network condition, the number of concurrent other system information block data requests can include a first number, and further operations can include determining, in a second determining based on second condition data representative of a second network condition, that at least a second number of concurrent other system information block data requests are expected to be received from the user equipment, in which at least the second number satisfies second expected concurrent other system information block request criterion data representative of a second criterion applicable to taking second action with respect to the second network condition, and in response to the second determining, changing the broadcast status element in the updated minimum system information block data representative of the updated minimum system information block from the broadcasting status to the not broadcasting status, resulting in reverted minimum system information block data representative of a reverted minimum system information block, broadcasting, via the base station, the reverted minimum system information block data, the updated minimum system information block comprising the broadcast status element as changed to the not broadcasting status, and halting the broadcasting of the other system information block data via the base station.

Further operations can include receiving, from one of the user equipment in response to the updated minimum system information block data, a request for the other system information block data, and communicating the other system information block data to the one of the user equipment in response to the request.

The base station can be part of a group of base stations, and the condition data can be common to the group of base stations.

One or more example aspects are represented in FIG. 7, and, for example, can correspond to operations, such as of a method. Example operation 702 represents receiving, at a first time by a mobile device comprising a processor, first minimum system information block data representing a first minimum system information block broadcast by network equipment that is part of a communication network. Example operation 704 represents processing, by the mobile device, the first minimum system information block data to determine that other system information block data, other than data comprised in the first minimum system information block data, is not being broadcasted by the network equipment. Example operation 706 represents in response to the processing of the first minimum system information block data, sending, by the mobile device, a request to the network equipment to obtain the other system information block data. Example operation 708 represents receiving, by the mobile device at a second time that is later than the first time, second minimum system information block data representing a second minimum system information block broadcast by the network equipment. Example operation 710 represents processing, by the mobile device, the second minimum system information block data to determine that the other system information block data is to be broadcast by the network equipment. Example operation 712 represents receiving, by the mobile device, the other system information block data responsive to being broadcast by the network equipment.

If the request to the network equipment to obtain the other system information block data does not result in obtaining the other system information block data, processing the second minimum system information block data can occur in response to receiving, by the mobile device, a paging message that indicates a system information modification.

Receiving the paging message can be based on the user equipment having received the first minimum system information block data, and that the system information modification occurred while the mobile device was in an idle state.

Processing the first minimum system information block data can include evaluating, by the mobile device, a first instance of a system broadcast status element in the first minimum system information block, and processing of the second minimum system information block data can include evaluating, by the mobile device, a second instance of the system broadcast status element in the second minimum system information block.

The request to the network equipment can include a first request to the network equipment, and further operations can include receiving, by the mobile device at a third time that is later than the second time, third minimum system information block data representing a third minimum system information block, processing, by the mobile device, the third minimum system information block data to determine that the other system information block data is not being broadcasted by the network equipment, in response to the processing of the third minimum system information block data, sending, by the mobile device, a second request to the network equipment to obtain the other system information block data, and receiving, by the mobile device, the other system information block data.

Figure 8:
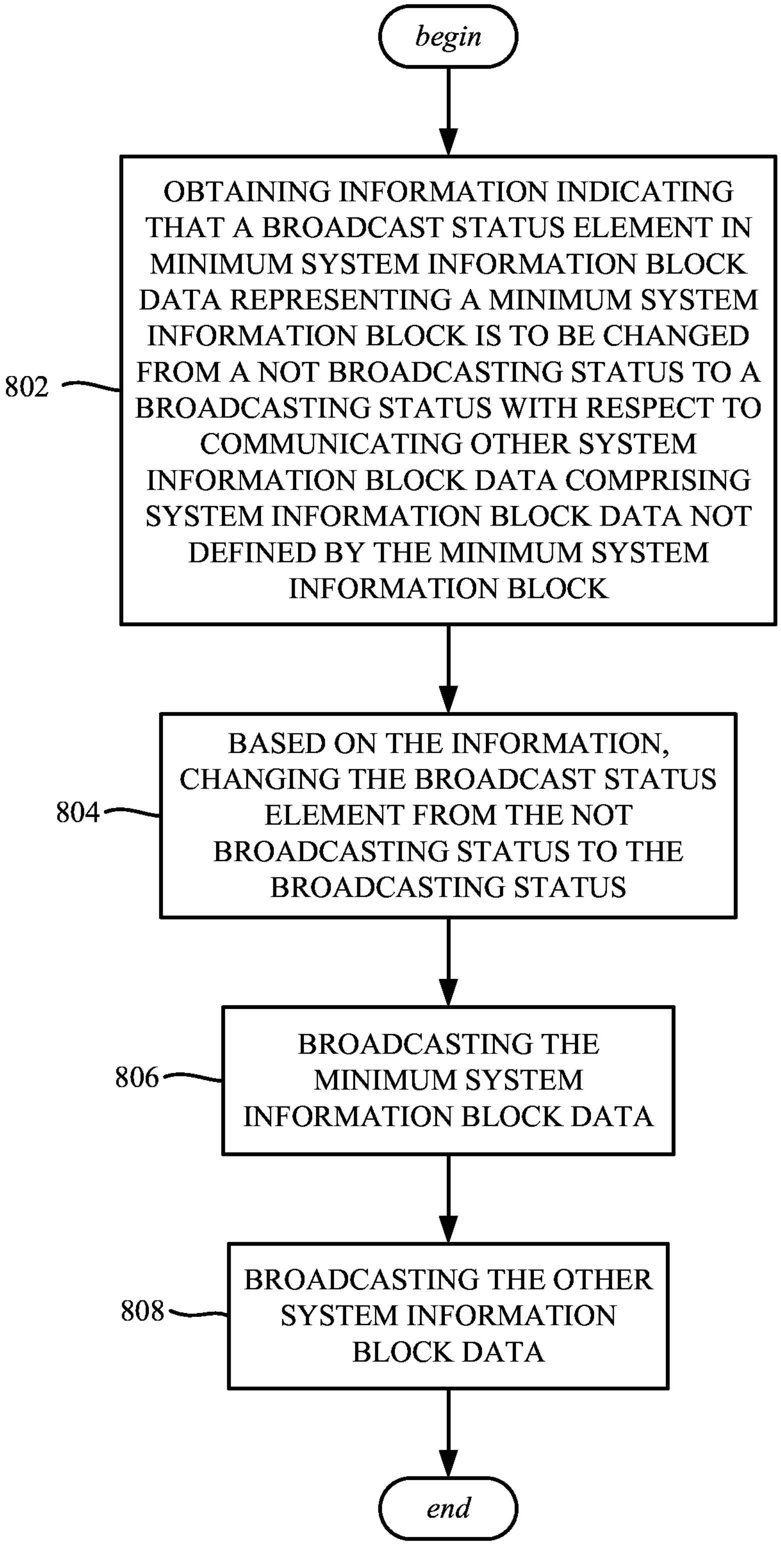
FIG. 8 is a flow diagram representing example operations related to changing a not broadcasting status element to a broadcasting status, in accordance with various aspects and embodiments of the subject disclosure.

One or more aspects are represented in FIG. 8, such as implemented in a machine-readable medium, including executable instructions that, when executed by a processor of a base station, facilitate performance of operations. Example operation 802 represents obtaining information indicating that a broadcast status element in minimum system information block data representing a minimum system information block is to be changed from a not broadcasting status to a broadcasting status with respect to communicating other system information block data comprising system information block data not defined by the minimum system information block. Example operation 804 represents based on the information, changing the broadcast status element from the not broadcasting status to the broadcasting status. Example operation 806 represents broadcasting the minimum system information block data. Example operation 808 represents broadcasting the other system information block data.

Further operations can include sending a paging message to instruct multiple user equipment to process the minimum system information block data as updated.

Obtaining of the information can include at least one of: obtaining event data representing a defined network event or obtaining historical data representing historical network activity.

Further operations can include obtaining updated information indicating that the broadcast status element in the minimum system information block data is to be changed from the broadcasting status to the not broadcasting status with respect to communicating the other system information block data, based on the updated information, changing the broadcast status element from the broadcasting status to the not broadcasting status resulting in updated minimum system information block data representing an updated minimum system information block, broadcasting the updated minimum system information block data and halting the broadcasting of the other system information block data.

Further operations can include receiving, from a user equipment responsive to the user equipment having received the updated minimum system information block data, a request for the other system information block data, and communicating the other system information block data to the user equipment in response to the request.

As can be seen, the technology described herein achieves more optimal system performance for 5G base stations (gNBs) that are configured with on-demand SI delivery based on conditions indicating that large number of UEs in the network will transition from idle to connected mode, e.g., in the near future. The technology described herein operates to reduce signaling overhead, as well as UE battery consumption related to repeated SI-request messaging.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) “multi-carrier system”, “multi-cell operation”, “multi-carrier operation”, “multi-carrier” transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification’s transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 9:
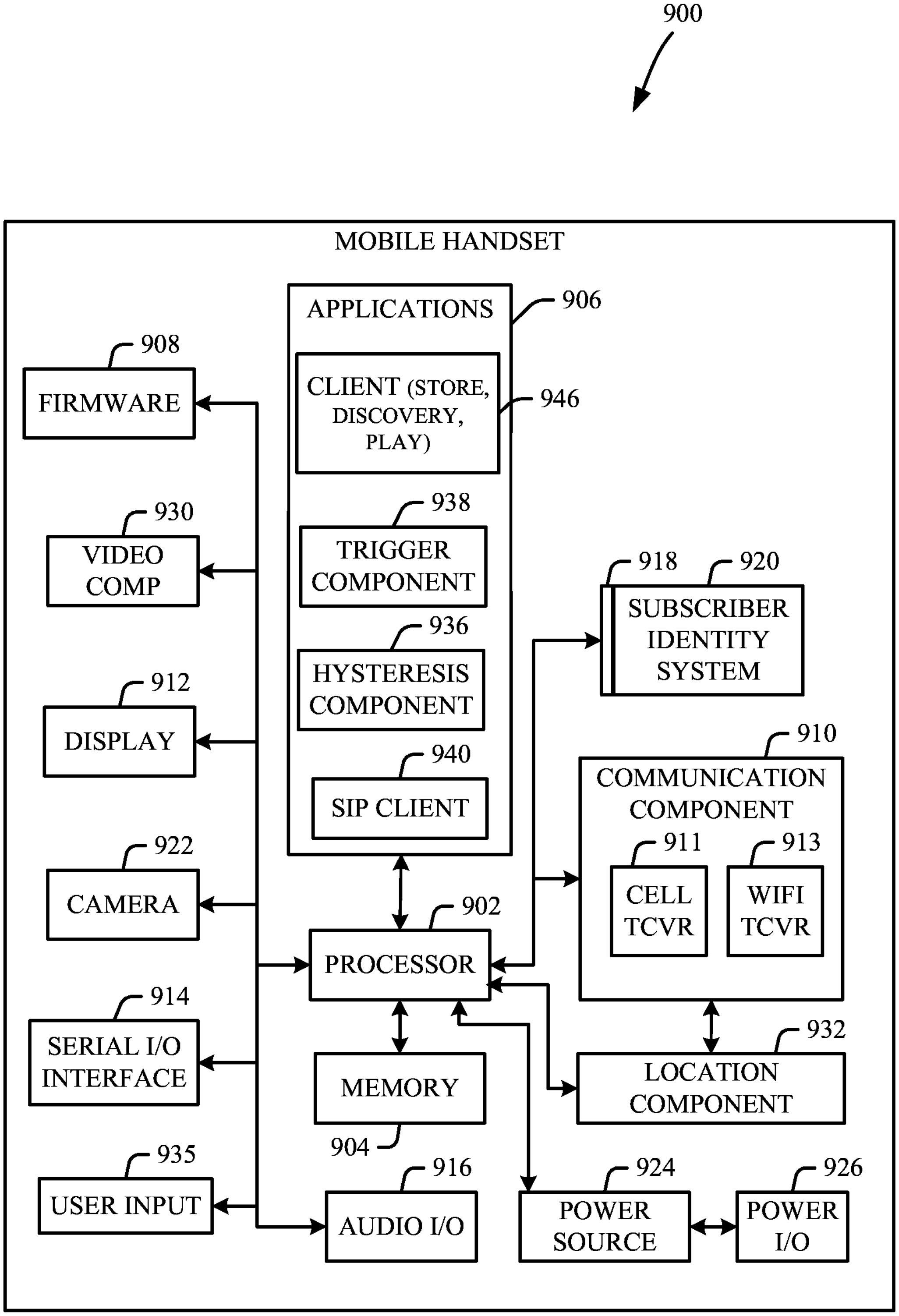
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
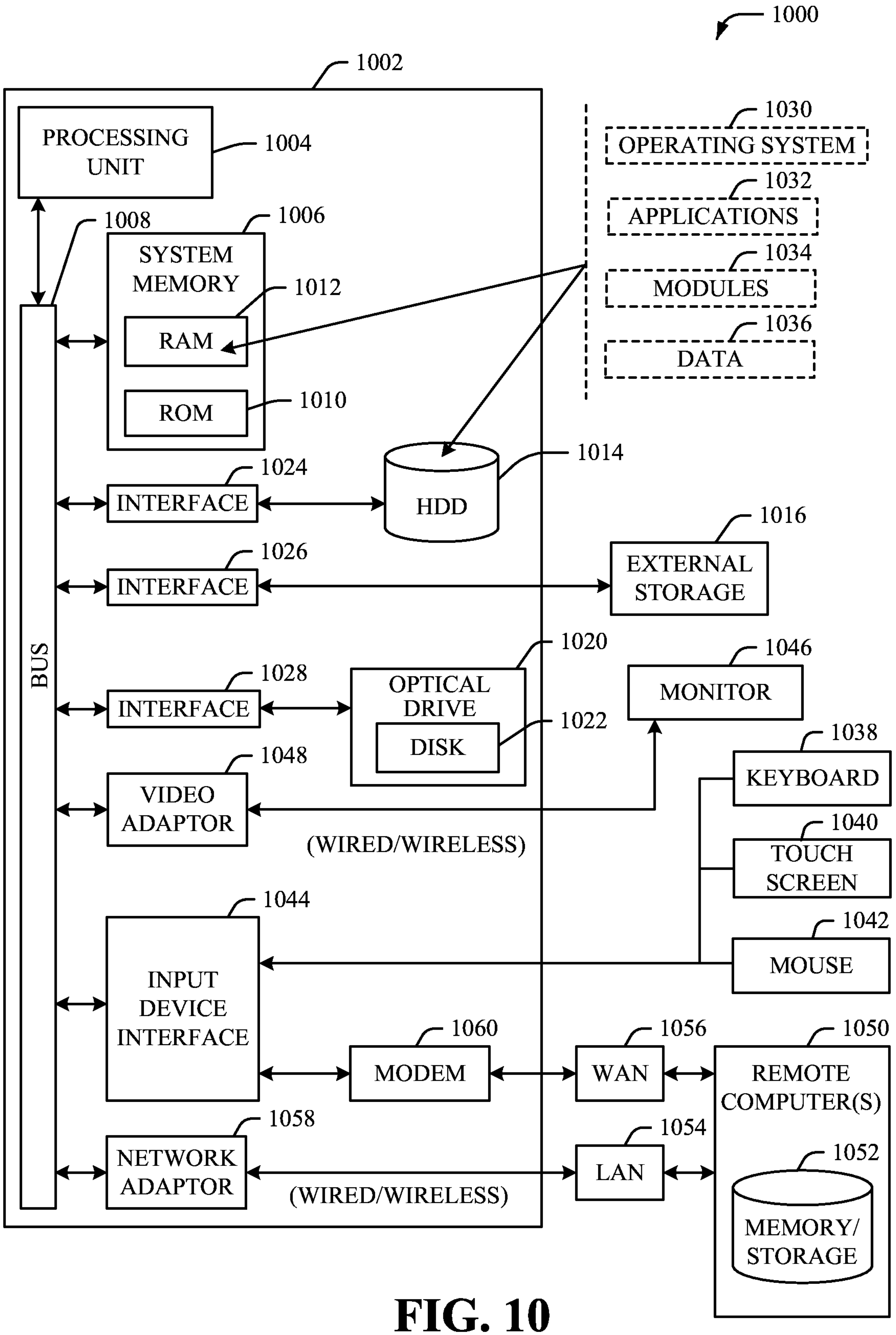
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:

a processor; and a memory that stores executable instructions that, when executed by the processor of the system, facilitate performance of operations, the operations comprising:

determining from condition data representative of a network condition that at least a number of concurrent other system information block data requests for other system information block data, other than system information block data specified in minimum system information block data, are expected to be received from user equipment, in which at least the number satisfies expected concurrent other system information block request criterion data representative of a criterion applicable to taking action with respect to the network condition; and in response to the determining, changing a broadcast status element in the minimum system information block data representative of a minimum system information block from a not broadcasting status to a broadcasting status, resulting in updated minimum system information block data representative of an updated minimum system information block, broadcasting the updated minimum system information block data via a base station, the updated minimum system information block comprising the broadcast status element as changed to the broadcasting status, and broadcasting the other system information block data via the base station for receipt by the user equipment.

2. The system of claim 1, wherein the minimum system information block comprises a new radio master information block and a system information block type1 system information block.

3. The system of claim 1, wherein the other system information block data comprises at least one system information block other than a system information block type1 system information block.

4. The system of claim 1, wherein the broadcast status element in the minimum system information block comprises a new radio SI-BroadcastStatus element.

5. The system of claim 1, wherein:

the condition data comprises event data; and the determining from the condition data that at least a number of concurrent other system information block data requests for other system information block data are expected to be received from user equipment comprises:

estimating, based on the event data, the number of concurrent other system information block data requests for other system information block data that are expected to be received from user equipment.

6. The system of claim 1, wherein;

the condition data comprises historical data; and the determining from the condition data that at least a number of concurrent other system information block data requests for other system information block data are expected to be received from user equipment comprises:

estimating, based on the historical data, the number of concurrent other system information block data requests for other system information block data that are expected to be received from user equipment.

7. The system of claim 1, wherein the operations further comprise sending a paging message via the base station, the paging message indicating that a modification to system information has occurred, in which the paging message instructs the user equipment to process the minimum system information block comprising the broadcast status element as changed to the broadcasting status.

8. The system of claim 1, wherein the criterion is a first criterion, wherein the determining is a first determining, wherein the condition data representative of the network condition is first condition data representative of a first network condition, wherein the number of concurrent other system information block data requests is a first number, and wherein the operations further comprise:

determining, in a second determining based on second condition data representative of a second network condition, that at least a second number of concurrent other system information block data requests are expected to be received from the user equipment, in which at least the second number satisfies second expected concurrent other system information block request criterion data representative of a second criterion applicable to taking second action with respect to the second network condition; and in response to the second determining, changing the broadcast status element in the updated minimum system information block data representative of the updated minimum system information block from the broadcasting status to the not broadcasting status, resulting in reverted minimum system information block data representative of a reverted minimum system information block, broadcasting, via the base station, the reverted minimum system information block data, the reverted minimum system information block comprising the broadcast status element as changed to the not broadcasting status, and halting the broadcasting of the other system information block data via the base station.

9. The system of claim 8, wherein the operations further comprise receiving, from one of the user equipment in response to the updated minimum system information block data, a request for the other system information block data, and communicating the other system information block data to the one of the user equipment in response to the request.

10. The system of claim 1, wherein the base station is part of a group of base stations, and wherein the condition data is common to the group of base stations.

11. A non-transitory machine-readable medium, comprising executable instructions that, when executed by a processor of a base station, facilitate performance of operations, the operations comprising:

obtaining information indicating that a broadcast status element in minimum system information block data representing a minimum system information block is to be changed from a not broadcasting status to a broadcasting status with respect to communicating other system information block data comprising system information block data not defined by the minimum system information block, wherein the obtaining the information comprises:

determining, from condition data indicative of a network condition, that a threshold number of concurrent requests for other system information block data from user equipment is expected;

based on the information, changing the broadcast status element from the not broadcasting status to the broadcasting status;

broadcasting the minimum system information block data; and broadcasting the other system information block data.

12. The non-transitory machine-readable medium of claim 11, wherein the operations further comprise sending a paging message to instruct multiple user equipment to process the minimum system information block data as updated.

13. The non-transitory machine-readable medium of claim 11, wherein the obtaining of the information further comprises at least one of: obtaining event data representing a defined network event or obtaining historical data representing historical network activity.

14. The non-transitory machine-readable medium of claim 11, wherein the operations further comprise:

obtaining updated information indicating that the broadcast status element in the minimum system information block data is to be changed from the broadcasting status to the not broadcasting status with respect to communicating the other system information block data;

based on the updated information, changing the broadcast status element from the broadcasting status to the not broadcasting status resulting in updated minimum system information block data representing an updated minimum system information block;

broadcasting the updated minimum system information block data; and halting the broadcasting of the other system information block data.

15. The non-transitory machine-readable medium of claim 14, wherein the operations further comprise receiving, from a user equipment responsive to the user equipment having received the updated minimum system information block data, a request for the other system information block data, and communicating the other system information block data to the user equipment in response to the request.

16. A method for dynamically adjusting system information delivery in a wireless communication network, the method comprising:

determining, by a processing system including a processor, from condition data indicative of a network condition, that a threshold number of concurrent requests for other system information block data from user equipment is expected;

in response to the determining, changing, by the processing system, a broadcast status indicator in minimum system information block data from a not broadcasting status to a broadcasting status to generate updated minimum system information block data;

broadcasting, by the processing system, the updated minimum system information block data via a base station;

transmitting, by the processing system, a paging message from the base station to instruct the user equipment to process the updated minimum system information block data; and broadcasting, by the processing system, the other system information block data via the base station for receipt by the user equipment.

17. The method of claim 16, further comprising:

retrieving, by the processing system, the condition data, wherein retrieving the condition data comprises retrieving event data; and estimating, by the processing system, based on the event data, a number of concurrent requests for other system information block data.

18. The method of claim 17, wherein the retrieving the condition data comprises retrieving historical data, and further comprising:

estimating, by the processing system based on the historical data, the number of concurrent requests for other system information block data.

19. The method of claim 16, further comprising:

transmitting, by the processing system, a paging message that includes a system information modification flag instructing the user equipment to reprocess the updated minimum system information block data.

20. The method of claim 16, further comprising:

receiving, by the processing system, updated condition data indicative of a network condition that no longer justifies broadcasting; and in response thereto, changing, by the processing system, the broadcast status indicator from the broadcasting status to a not broadcasting status, thereby ceasing the broadcasting of the other system information block data.

* * * * *